United States Patent [19]

Havranek et al.

[11] 4,244,745
[45] Jan. 13, 1981

[54] HIGH-STRENGTH REFRACTORY CASTING COMPOUND FOR THE MANUFACTURE OF MONOLITHIC LININGS

[75] Inventors: Peter H. Havranek; Lars O Thornblad, both of Höganäs, Sweden

[73] Assignee: Höganäs AB, Höganäs, Sweden

[21] Appl. No.: 44,327

[22] Filed: May 31, 1979

[30] Foreign Application Priority Data

Jun. 22, 1978 [SE] Sweden ............................... 7807178

[51] Int. Cl.$^3$ .......................... C04B 35/02; C04B 7/32
[52] U.S. Cl. ........................................ 106/64; 106/44; 106/58; 106/65; 106/104
[58] Field of Search .................... 106/64, 104, 44, 58, 106/65

[56] References Cited

U.S. PATENT DOCUMENTS

| | | | |
|---|---|---|---|
| 2,419,684 | 4/1947 | Johnson et al. | 106/64 |
| 3,181,959 | 5/1965 | Raine et al. | 106/64 |
| 3,253,936 | 5/1966 | Weindel | 106/64 |
| 3,802,894 | 4/1974 | Prost | 106/64 |
| 4,102,695 | 7/1978 | Claverie | 106/104 |

Primary Examiner—O. R. Vertiz
Assistant Examiner—Mark Bell
Attorney, Agent, or Firm—Burns, Doane, Swecker & Mathis

[57] ABSTRACT

High-strength refractory casting compound for monolithic furnace linings, consisting of refractory, durable, granular filler, reactive alumina, high-grade calcium aluminate cement and silica sol as the only liquid to provide castability and ceramic bond. The addition of 6 to 10 parts by weight of a 40% silica sol, i.e. containing 3.6 to 6 parts by weight water, per 100 parts by weight dry material mixed as above is suitable, the reactive alumina constituting 5 to 15 parts by weight and the high-grade calcium aluminate cement constituting 1.5 to 5 parts by weight of said dry material.

8 Claims, No Drawings

HIGH-STRENGTH REFRACTORY CASTING COMPOUND FOR THE MANUFACTURE OF MONOLITHIC LININGS

The invention is concerned with a high-strength refractory casting composition for the manufacture of monolithic linings. It is the general object of the invention to provide a composition which can be cast to form a monolithic lining while containing a low percentage of water.

Monolithic refractory linings, especially those manufactured by means of casting, are rapidly gaining ground over the refractory linings consisting of bricks for use in high-temperature industries. The reasons for this development are primarily more convenient installation and lower lining costs incurred with the casting method. The drawbacks so far have been the relatively high water content in the casting compounds resulting in problems in drying and firing the lining as well as the relatively high porosity remaining after evaporation of the water, resulting in relatively low mechanical strength in the lining.

In certain fields of application which are suitable for monolithic linings because of the difficulty of producing a lining of bricks, such as rotary furnaces and reheating furnaces, the resistance to mechanical wear at increased temperatures is of primary importance. For these purposes, high-strength refractory casting compounds have so far normally been used which are composed substantially of durable, granular aggregates bound with high-grade calcium aluminate cement. To achieve high mechanical strength, the content of calcium aluminate cement has usually been between 10 and 25% by weight in these cases, requiring a water content of 8 to 12% by weight depending on the type of granular aggregates and vibration method used. Water contents of this magnitude in these compounds give rise to risks of water-vapour explosions if drying and firing to produce the finished lining are not performed sufficiently carefully.

One of the drawbacks mentioned here, the risk of water-vapour explosions, can be avoided by evaporating the water extremely slowly, or by removing it extremely quickly by mixing channel-forming elements (such as straw) into the compound. See Swedish Pat. No. 7315942-8. Nevertheless, it is still desirable to be able to reduce the water content of the casting compounds, particularly to improve the wear resistance of the finished lining.

In order to increase the strength of monolithic refractory linings bound with calcium aluminate cement, it has been proposed in U.S. Pat. No. 3,802,894 to reduce the content of calcium aluminate cement to between 5 and 8% by weight while using 2.5 to 4% by weight fine powder having a high specific area, and a surface-active agent, so that the quantity of water required for casting could be reduced to 6-7% by weight.

Lower water contents than the lowest achieved so far in compounds bound with calcium aluminate cement would result in incomplete binding and thus insufficient strength in the lining produced. The same unfavourable result would also follow a simultaneous decrease in the cement and water contents, since the percentage of binder would then be too low.

The invention is concerned with the task of finding a new way of reducing the water content in the lining compounds in question, while retaining their casting properties. The solution of this problem is based on the idea that a certain volume of liquid is required both to bind the cement and to provide a glide surface between the refractory particles in the compound, but that this liquid need not be pure water but might consist of a water solution, the water content being sufficient to bind the cement, whereas the component dissolved in the water can participate in the final binding when the lining is fired.

Such a liquid, suitable for casting compounds according to the invention, has been found to be a silica sol of the type described in Kirk-Othmer, Encyclopedia of chemical Technology, 1969, Vol. 18, page 66 and sold by Du Pont under the name of LUDOX. Such silica sol is available in various concentrations and of these we have found the sol containing 40% by weight silica to be the most suitable for the purpose according to the invention. The addition of the same volume of 40% silica sol as was previously added in the form of water would represent a 40% decrease in the total water content of the finished casting compound.

Experiments performed have shown that not only is this possible, but that the use of silica sol instead of water also enables a considerable reduction in the quantity of calcium aluminate cement. However, in order to obtain high strength and resistance to wear at high temperatures, a small quantity of powdered reactive alumina having a particle size less than 100 mesh (U.S. sieve standard), preferably less than 325 mesh, should be mixed into the compound. On the other hand, the addition of surface-active agents or deflocculents is entirely unnecessary to achieve the desired fluidity for vibration casting.

The castable refractory compound with extremely good thermal strength properties according to the invention, consists of refractory casting compound for manufacturing monolithic linings. The reactive alumina, the calcium aluminate cement and the silica sol give the cast lining the requisite green strength for being stripped after 1 to 2 hours, and also produce an extremely strong ceramic binding in the monolithic lining after firing.

The filler, which may also be referred to as "aggregate" or "grog", may be selected from the usual group of refractory materials: chamotte, calcined or molten alumina, calcined bauxite, mullite, diaspore, spinel, chromium ore, magnesium oxide and silicon carbide. The filler suitably constitutes 80–90 parts by weight, together with a mixture of 1.5–5 parts by weight calcium aluminate cement and 5–15 parts by weight reactive alumina to make up the total of 100 parts by weight. To this is added a 40% silica sol in a quantity giving the finished compound mixture a total water content of about 3.5–5% by weight.

The casting compound according to the invention is prepared in the normal manner by mixing the components. It is preferable first to mix the calcium aluminate cement with the powdered reactive alumina, thereafter adding this mixture to the filler, and to add the silica sol as the last step. Suitable weight ratios are about 80 to 90 parts by weight of filler, 10 to 20 parts by weight of the mixture consisting of reactive alumina and calcium aluminate cement and as a final additive, about 6 to 10 parts by weight silica sol to 100 parts of the final dry substance mixture.

To illustrate the effect achieved (1) through the invention a comparison is given in tables 1 and 2 below (2) a conventional mullite compound bonded with calcium aluminate cement, a corresponding mullite compound according to the invention, and (3) a compound with a high content of alumina, also bonded in accordance with the invention.

TABLE 1

| Components: | Comp. 1 | Comp. 2 | Comp. 3 |
|---|---|---|---|
| Calcined mullite | 60 | 50 | — |
| Calcined alumina | 15 | 37.5 | — |
| Molten alumina | — | — | 87 |
| Reactive alumina | — | 10 | 10.5 |
| Calcium aluminate cement (high-grade) | 25 | 2.5 | 2.5 |
| Silica sol (40% $SiO_2$) | — | 9 | 6.5 |
| Water | 9–10 | — | — |

The figures in the table indicate parts by weight.

TABLE 2

| Properties: after firing at 1000° C. | Comp. 1 | Comp. 2 | Comp. 3 |
|---|---|---|---|
| Compressive strength kgf/cm$_2$ | 930 | 1150 | 2020 |
| Density | 2.50 | 2.80 | 3.20 |
| Apparent porosity | 25% | 17% | 15% |
| Explosion test | Explosion | No explosion | No explosion |
| Hot bending strength at 1000° C. kgf/cm$^2$ | 130 | 400 | 400 |

Hot bending strength is used as a measurement of strength in refractory material at the operating temperature in question. The comparison was performed at 1000° C. the temperature which is known from experience to produce the lowest strength in compounds bonded with calcium aluminate cement.

The above values for hot bending strength at 1000° C. show that compounds (2) and (3) according to the invention have roughly three times greater strength than the conventional compound (1).

In view of its storing properties, the compound is prepared, stored and delivered to the customer in the form of two components, the first consisting of a mixture of the solid components and the second of a silica sol having such concentration, at least about 30%, preferably about 40%, that a suitable casting compound is obtained by mixing these components in the ratio stated, without the addition of water.

We claim:

1. A refractory casting compound having high strength and high resistance to wear at high temperatures comprising (a) 80–90 parts by weight of a granular refractory filler, (b) 10–20 parts by weight of a mixture consisting of 5–15 parts by weight of reactive alumina and 1.5–5 parts by weight of calcium aluminate cement for a total of 100 parts by weight of said filler and said mixture, and (c) 6–10 parts by weight of a silica sol which contains at least 30 percent by weight of silica.

2. The casting compound of claim 1 wherein said silica sol contains at least 40 percent by weight of silica.

3. The casting compound of claim 2 comprising about 50 parts by weight of calcined mullite, about 37.5 parts by weight of calcined alumina, about 10 parts by weight of reactive alumina, about 2.5 parts by weight of calcium aluminate cement, and about 9 parts by weight of silica sol.

4. The casting compound of claim 2 comprising about 87 parts by weight of molten alumina, about 10.5 parts by weight of reactive alumina, about 2.5 parts by weight of calcium aluminate cement, and about 6.5 parts by weight of silica sol.

5. The casting compound of claim 1 wherein the reactive alumina has a particle size of less than 100 mesh.

6. The casting compound of claim 5 wherein the reactive alumina has a particle size of less than 325 mesh.

7. The casting compound of claim 1 wherein said silica sol contains about 3.5–5 percent by weight of water.

8. A method of preparing a refractory casting compound comprising admixing 80–90 parts by weight of a granular refractory filler and 10–20 parts by weight of a mixture consisting of 5–5 parts by weight of reactive alumina and 1.5–5 parts by weight of calcium aluminate cement to yield 100 parts by weight of said filler and said mixture, and thereafter adding to said admixture 6–10 parts by weight of silica sol containing at least about 30 percent by weight of silica.

* * * * *